(12) United States Patent
Bishop (10) Patent No.: US 10,503,499 B2
(45) Date of Patent: Dec. 10, 2019

(54) METHODS AND SYSTEMS FOR MANAGING AGILE DEVELOPMENT

(71) Applicant: David Anthony Bishop, Woodstock, GA (US)

(72) Inventor: David Anthony Bishop, Woodstock, GA (US)

(73) Assignee: David Anthony Bishop, Woodstock, GA (US)

( * ) Notice: Subject to any disclaimer, the term of this patent is extended or adjusted under 35 U.S.C. 154(b) by 241 days.

(21) Appl. No.: 15/369,786

(22) Filed: Dec. 5, 2016

(65) Prior Publication Data

US 2017/0161063 A1    Jun. 8, 2017

Related U.S. Application Data

(60) Provisional application No. 62/263,059, filed on Dec. 4, 2015.

(51) Int. Cl.
*G06F 9/44*    (2018.01)
*G06F 8/77*    (2018.01)
*G06Q 10/10*   (2012.01)

(52) U.S. Cl.
CPC ............. *G06F 8/77* (2013.01); *G06Q 10/101* (2013.01)

(58) Field of Classification Search
CPC ........................................................ G06F 8/77
USPC .......................................................... 717/102
See application file for complete search history.

(56) References Cited

U.S. PATENT DOCUMENTS

| | | | | |
|---|---|---|---|---|
| 6,233,493 B1* | 5/2001 | Cherneff | ................ | G06Q 10/06 700/103 |
| 6,662,357 B1* | 12/2003 | Bowman-Amuah | ..... | G06F 8/20 717/120 |
| 7,139,999 B2* | 11/2006 | Bowman-Amuah | ........................ | G06Q 10/06 717/101 |
| 8,249,906 B2* | 8/2012 | Ponce de Leon | ...... | G06Q 10/06 705/28 |
| 2001/0051890 A1* | 12/2001 | Burgess | ................ | G06Q 10/06 705/7.14 |
| 2002/0144212 A1* | 10/2002 | Lev | ..................... | G06F 17/5045 716/102 |
| 2004/0143477 A1* | 7/2004 | Wolff | ............... | G06Q 10/06316 705/7.26 |
| 2006/0112371 A1* | 5/2006 | Oikawa | .................. | G06Q 10/06 717/114 |
| 2010/0058284 A1* | 3/2010 | Swaminathan | ........... | G06F 8/36 717/101 |

* cited by examiner

*Primary Examiner* — Evral E Bodden
(74) *Attorney, Agent, or Firm* — Troutman Sanders LLP; James E. Schutz; Christopher C. Close, Jr.

(57) ABSTRACT

Aspects of the present disclosure provide a method for managing product development that includes receiving development data. The method also includes recording an amount of time spent developing one or more project features; calculating, based at least in part on development data and the amount of time spent developing the feature, business momentum; and calculating, based on certain development data, project agility and market agility.

17 Claims, 4 Drawing Sheets

METHODS AND SYSTEMS FOR MANAGING AGILE DEVELOPMENT

CROSS-REFERENCE TO RELATED APPLICATIONS

This application claims priority to, and the benefit under 35 U.S.C. § 119(e), of U.S. Provisional Patent Application No. 62/263,059, filed 4 Dec. 2015, the entire contents and substance of which are hereby incorporated by reference as if fully set forth below.

TECHNICAL FIELD OF THE INVENTION

The various embodiments of the present disclosure relate generally to the management of development efforts for software, firmware, and/or hardware. More particularly, the various embodiments of the present disclosure are directed to methods and systems for managing Agile and hybrid-Agile development efforts for software, firmware, and/or hardware.

BACKGROUND

Agile development of software, firmware, and/or hardware concerns the economy of scope, as opposed to scale, and can be defined as the ability to manage and apply knowledge effectively, to adapt to change, and the capability to quickly respond to market requirements. The term "Agility" may be used to refer to the practice of Agile development.

Generally, Agile development methods, according to the disclosed technology, break product development work into small increments, which may minimize the amount of up-front planning and design required by the development organization. Typically, iterations are short time frames, and each iteration generally involves a cross-functional team working in all applicable capacities (e.g., planning, analysis, design, coding, and testing). At the end of an iteration, a working product is typically demonstrated to the customer. The underlying theory of Agile development is that this iterative process may minimize overall risk and allow the development organization to quickly adapt to changes by increasing the involvement of the customer throughout development and thus allowing changes to be made during development. It should be noted that a completed iteration does not necessarily render a final, market-releasable product. Instead, one of the goals of each iteration is to present a working product with respect to a particular iteration, which is a primary measure of development progress.

Agility may be further broken down into various dimensions: enriching the customer, cooperating to increase competitiveness, organizing to control change and uncertainty, and leveraging the impact of people and information. The speed with which a development organization can respond to customer requests, market dynamics, and emerging technical change may be viewed as a key element of an Agile approach. This includes time to sense relevant events, time to interpret what is happening and assess the consequences for the organization, time to explore options and decide which actions to take, and time to implement the appropriate responses. Organizational capabilities that provide the basis for conducting business and creating change are also considered a prerequisite to achieve Agility.

As it relates to development, Agile is an iterative development methodology based on self-organizing and cross-functional teams. Key concepts include: individuals and their interactions are more important than processes and tools, working software is more important than documentation, customer collaboration is more important than contract negotiation, and responding to change is more important than following a plan.

While these methodologies have become increasingly popular and accepted for managing software development, challenges exist in the adoption and implementation of Agile techniques and for determining what the optimum level of adoption is, especially with respect to certain applications.

For instance, embedded systems provide an especially challenging development environment due to the required parallel management of software, firmware, and hardware development. Embedded systems can be found in a variety of applications, including the Internet of Things. Extreme market demands for innovative products may result in hyper accelerated markets that present added difficulty for the development of software, firmware, and/or hardware. An embedded system typically consists of a combination of software, firmware, and hardware components that must be developed and tested in tandem. Because of the characteristics of embedded systems, making a change to an embedded device (e.g., once several physical products have already rolled off the assembly line) could be a monumental undertaking both technically and financially. In line with these characteristics, Agile methods are often not considered by development organizations for embedded systems development, likely due to a lack of full life cycle support and tools. More specifically, this hesitance may be at least partly attributable to the fact that firmware and hardware development teams tend to be much smaller than their software counterparts and tend to possess a much higher degree of specialization. While many software developers in an organization may possess skills that are easily transferable from one project to another (such as C#, Java, or .NET programming), their firmware counterparts typically do not share the same level of transferability. Firmware professionals often have very focused knowledge of the embedded systems stacks (e.g., home area networking, RF network communication, or metering metrology) that inhibits them from being easily interchangeable. Embedded systems are often mission-critical systems with corresponding high consequences of failure. As a result, organizations developing such systems tend to be less comfortable with the higher rates of change that often accompany the iterative Agile development as compared to organizations developing only software.

Regarding the appropriate level of adoption of Agile methodologies, some applications may benefit from the combination and mixing of certain aspects of Agile with other development methodologies. For instance, certain development efforts may benefit from mixing some aspects of Agile with some aspects of the waterfall methodology. Whereas Agile methods present an iterative development process in which, for instance, testing occurs simultaneously with programming, the waterfall methodology is a sequential process that has separate programming and testing phases, for instance. For example, in a typical waterfall methodology, the testing phase does not begin until the programming phase has been completed. That is, a subsequent stage of development does not begin until a previous stage has been completed. Such a transfer of development focus is sometimes referred to as a stage gate. Currently, there is no definition or criterion available to determine the appropriate mix of Agile, waterfall, and other development methodologies for particular development efforts.

Current practices are unable to determine the value of a particular product development effort in relation to a specific business or development team's competitive position in the marketplace. That is, there does not currently exist a way to evaluate the adoption of Agile principles against quality and customer responsiveness. Thus, a business or development team cannot evaluate whether a product development effort is creating the most competitive result possible in its respective market.

BRIEF SUMMARY

The present disclosure relates to methods and systems for managing agile development. An example embodiment of the present disclosure provides a method for managing product development. The method may include receiving development data that has project requirements data, such as data comprising a time value indicating a time required for development for a feature of a project, and project timeline data, which may include a feature deadline and a development deadline. The method may also include recording an amount of time spent developing the feature and calculating, based at least in part on the time value and the amount of time spent developing the feature, business momentum.

An example embodiment may provide a method for managing product development that includes receiving development data comprising customer data including a first feature of a project; project timeline data including a feature deadline and a development deadline; budget data; and project requirements data. The project requirements data may include requirements of the first feature, a first priority value indicating a level of priority of the first feature, a first penalty value indicating a penalty for failing to deliver the first feature by the feature deadline and/or the development deadline, a first cost value indicating a financial cost of developing the first feature, and a first time value indicating a time required for development of the first feature. The example embodiment may also include calculating, based at least in part on the time value and the feature deadline, project agility and calculating, based at least in part on the cost value and the budget data, market agility.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE DRAWINGS

The following Detailed Description is better understood when read in conjunction with the appended drawings. For the purposes of illustration, drawings of example embodiments are shown, but the subject matter is not limited to the specific elements and instrumentalities disclosed. Reference will now be made to the accompanying figures and flow diagrams wherein.

DETAILED DESCRIPTION

Implementations of the disclosed technology include novel techniques for managing the development of software, firmware, and hardware. These novel techniques may provide new methods in which to determine the efficiency and efficacy with which development efforts are managed. The disclosed technology may enable a business or development team to quickly adapt to morphing market pressures while ensuring these adaptations remain within a particular business or team's constraints or available resources. Further, the disclosed technology may determine the value of a given product development effort with respect to the corresponding market of that product development effort. Various embodiments of the present disclosure address these desires In the following description, numerous specific details are set forth. However, it is to be understood that implementations of the disclosed technology may be practiced without these specific details. In other instances, well-known methods, structures, and techniques have not been shown in detail in order not to obscure an understanding of this description. References to "one implementation," "an implementation," "example implementation," "some implementations," "certain implementations," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described should be in a given sequence, either temporally, spatially, in ranking, or in any other manner.

Reference to "a user" or "the user" may be made throughout the Specification, Claims, and Abstract. It should be noted that this is not restrictive to a single person, unless otherwise noted or made contextually apparent. Instead, "the user" may encompass any user having access to alter, change, view, save, or otherwise interact with the system and methods described herein.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is intended to neither define the claims of the application nor limit the scope of the claims in any way. Instead, it is intended that the invention is defined by the claims appended hereto.

Various aspects described herein may be implemented using standard programming or engineering techniques to produce software, firmware, hardware, or any combination thereof to control a computing device to implement the disclosed subject matter. A computer-readable medium may include, for example: a magnetic storage device such as a hard disk, a floppy disk or a magnetic strip; an optical storage device such as a compact disk (CD) or digital versatile disk (DVD); a smart card; and a flash memory device such as a card, stick or key drive, or embedded component. A person of ordinary skill in the art will recognize many modifications may be made to this configuration without departing from the scope or spirit of the claimed subject matter.

Figure 1:
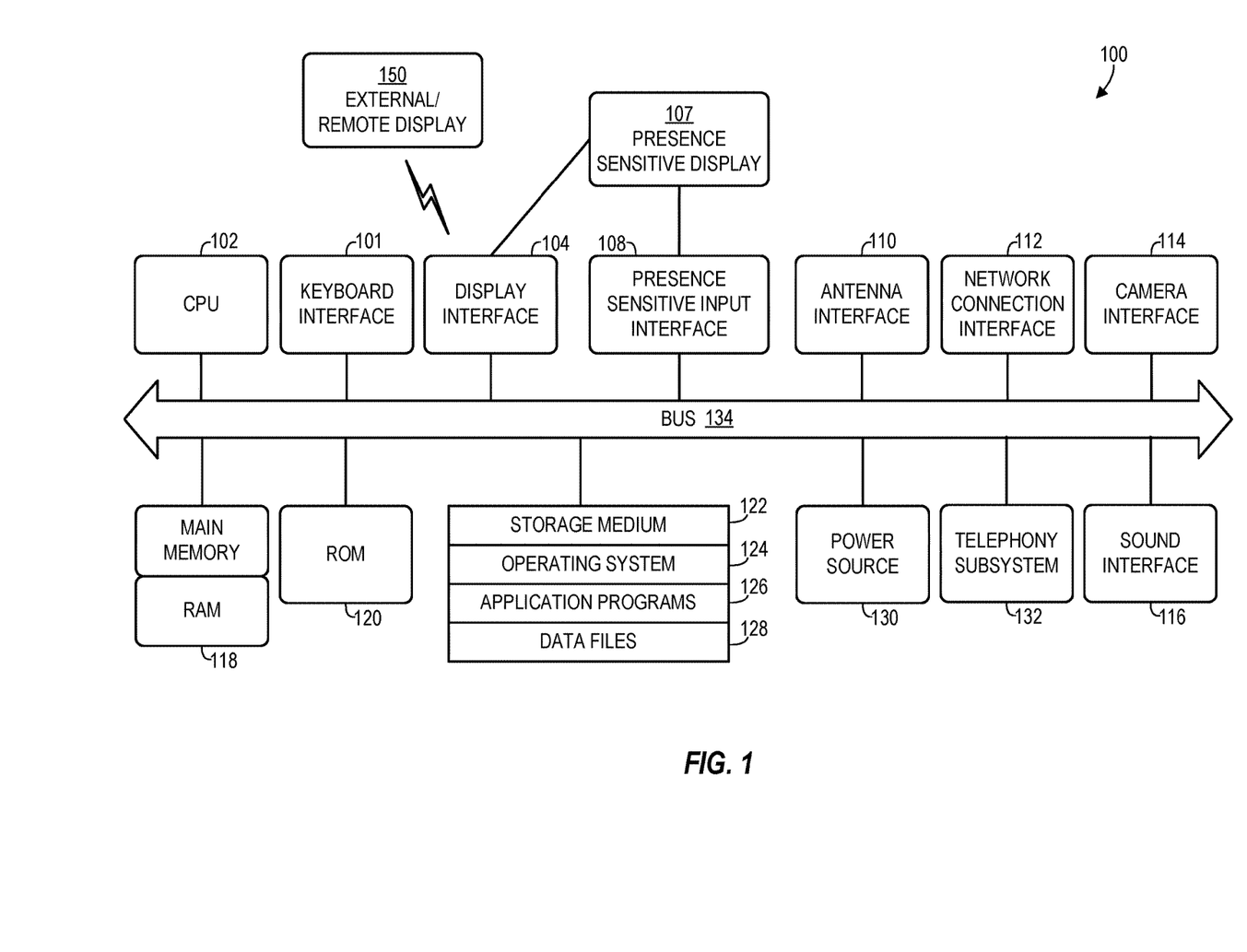
FIG. 1 is a block diagram illustrating a determination of agile vorticity, in accordance with an example embodiment of the present disclosure.

According to one example implementation, the terms computing device or mobile computing device, as used herein, may be a central processing unit (CPU), controller or processor, or may be conceptualized as a CPU, controller or processor (for example, the processor 101 of FIG. 1). In yet other instances, a computing device may be a CPU, controller or processor combined with one or more additional hardware components. In certain example implementations, the computing device operating as a CPU, controller or processor may be operatively coupled with one or more peripheral devices, such as a display, navigation system, stereo, entertainment center, Wi-Fi access point, or the like. In another example implementation, the term computing device, as used herein, may refer to a mobile computing device, such as a smartphone, mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In an example embodiment, the computing device may output content to its local display or speaker(s). In another example implementation, the computing device may output content to an external display device (e.g., over Wi-Fi) such as a TV or an external computing system.

FIG. 1 is a block diagram illustrating one embodiment of a computing device 100 in accordance with various aspects set forth herein. In FIG. 1, the computing device 100 may be configured to include a processor 101, which may also be referred to as a computing device, that is operatively coupled to a display interface 103, an input/output interface 105, a presence-sensitive display interface 107, a radio frequency (RF) interface 109, a network connection interface 111, a camera interface 113, a sound interface 115, a random access memory (RAM) 117, a read only memory (ROM) 119, a storage medium 121, an operating system 123, an application program 125, data 127, a communication subsystem 131, a power source 133, another element, or any combination thereof. In FIG. 1, the processor 101 may be configured to process computer instructions and data. The processor 101 may be configured to be a computer processor or a controller. For example, the processor 101 may include two computer processors. In one definition, data is information in a form suitable for use by a computer. It is important to note that a person having ordinary skill will recognize that the subject matter of this disclosure may be implemented using various operating systems or combinations of operating systems.

In FIG. 1, the display interface 103 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia interface (HDMI) port, a video port, an audio port, a Bluetooth port, a near-field communication (NFC) port, another like communication interface, or any combination thereof. In one example, the display interface 103 may be operatively coupled to a local display, such as a touch-screen display associated with a mobile device. In another example, the display interface 103 may be configured to provide video, graphics, images, text, other information, or any combination thereof for an external/remote display 141 that is not necessarily connected to the mobile computing device. In one example, a desktop monitor may be utilized for mirroring or extending graphical information that may be presented on a mobile device. In another example, the display interface 103 may wirelessly communicate, for example, via the network connection interface 111 such as a Wi-Fi transceiver to the external/remote display 141.

In the current embodiment, the input/output interface 105 may be configured to provide a communication interface to an input device, output device, or input and output device. The computing device 100 may be configured to use an output device via the input/output interface 105. A person of ordinary skill will recognize that an output device may use the same type of interface port as an input device. For example, a USB port may be used to provide input to and output from the computing device 100. The output device may be a speaker, a sound card, a video card, a display, a monitor, a printer, an actuator, an emitter, a smartcard, another output device, or any combination thereof. The computing device 100 may be configured to use an input device via the input/output interface 105 to allow a user to capture information into the computing device 100. The input device may include a mouse, a trackball, a directional pad, a trackpad, a presence-sensitive input device, a presence-sensitive display, a scroll wheel, a digital camera, a digital video camera, a web camera, a microphone, a sensor, a smartcard, and the like. The presence-sensitive input device may include a digital camera, a digital video camera, a web camera, a microphone, a sensor, or the like to sense input from a user. The presence-sensitive input device may be combined with a display to form a presence-sensitive display. Further, the presence-sensitive input device may be coupled to the computing device. The sensor may be, for instance, an accelerometer, a gyroscope, a tilt sensor, a force sensor, a magnetometer, an optical sensor, a proximity sensor, another like sensor, or any combination thereof. For example, the input device 115 may be an accelerometer, a magnetometer, a digital camera, a microphone, and an optical sensor.

In FIG. 1, the presence-sensitive display interface 107 may be configured to provide a communication interface to a display 108 or a presence sensitive input 110. In one definition, a presence-sensitive display is an electronic visual display that may detect the presence and location of a touch, gesture, or object near its display area. In one definition, a presence-sensitive input may be a device that accepts input by the proximity of a finger, a stylus, or an object near the device, such as a touch screen. In one definition, the term "near" means on, proximate or associated with. In another definition, the term "near" is the extended spatial location of. The RF interface 109 may be configured to provide a communication interface to RF components such as a transmitter, a receiver, and an antenna.

The network connection interface 111 may be configured to provide a communication interface to a network 143a. The network 143a may encompass wired and wireless communication networks such as a local-area network (LAN), a wide-area network (WAN), a computer network, a wireless network, a telecommunications network, another like network or any combination thereof. For example, the network 143a may be a cellular network, a Wi-Fi network, and a near-field network. As previously discussed, the display interface 103 may be in communication with the network connection interface 111, for example, to provide information for display on a remote display that is operatively coupled to the computing device 100. The camera interface 113 may be configured to provide a communication interface and functions for capturing digital images or video from a camera. The sound interface 115 may be configured to provide a communication interface to a microphone or speaker.

In this embodiment, the RAM 117 may be configured to interface via the bus 102 to the processor 101 to provide storage or caching of data or computer instructions during the execution of software programs such as the operating system, application programs, and device drivers. In one example, the computing device 100 may include at least one hundred and twenty-eight megabytes (128 Mbytes) of RAM. The ROM 119 may be configured to provide computer instructions or data to the processor 101. For example, the ROM 119 may be configured to be invariant low-level system code or data for basic system functions such as basic input and output (I/O), startup, or reception of keystrokes from a keyboard that are stored in a non-volatile memory. The storage medium 121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives. In one example, the storage medium 121 may be configured to include an operating system 123, an application program 125 such as a web browser application, a widget or gadget engine or another application, and a data file 127.

In FIG. 1, the computing device 101 may be configured to communicate with a network 143b using the communication subsystem 131. The network 143a and the network 143b may be the same network or networks or different network or networks. The communication functions of the communication subsystem 131 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 131 may include cellular communication, Wi-Fi communication, Bluetooth communication, and GPS communication. The network 143b may encompass wired and wireless communication networks such as a local-area network (LAN), a wide-area network (WAN), a computer network, a wireless network, a telecommunications network, another like network or any combination thereof. For example, the network 143b may be a cellular network, a Wi-Fi network, and a near-field network. The power source 133 may be configured to provide an alternating current (AC) or direct current (DC) power to components of the computing device 100.

In FIG. 1, the storage medium 121 may be configured to include a number of physical drive units, such as a redundant array of independent disks (RAID), a floppy disk drive, a flash memory, a USB flash drive, an external hard disk drive, thumb drive, pen drive, key drive, a high-density digital versatile disc (HD-DVD) optical disc drive, an internal hard disk drive, a Blu-Ray optical disc drive, a holographic digital data storage (HDDS) optical disc drive, an external mini-dual in-line memory module (DIMM) synchronous dynamic random access memory (SDRAM), an external micro-DIMM SDRAM, a smartcard memory such as a subscriber identity module or a removable user identity (SIM/RUIM) module, other memory, or any combination thereof. The storage medium 121 may allow the computing device 100 to access computer-executable instructions, application programs or the like, stored on transitory or non-transitory memory media, to off-load data, or to upload data. An article of manufacture, such as one utilizing a communication system may be tangibly embodied in storage medium 122, which may comprise a non-transitory computer-readable medium.

According to certain example implementations, the terms computing device or mobile computing device, as used herein, may be a central processing unit (CPU), controller or processor, or may be conceptualized as a CPU, controller or processor. In yet other instances, a computing device may be a CPU, controller or processor combined with one or more additional hardware components. In certain example implementations, the computing device operating as a CPU, controller or processor may be operatively coupled with one or more peripheral devices, such as a display, navigation system, stereo, entertainment center, Wi-Fi access point, or the like. In another example implementation, the term computing device, as used herein, may refer to a mobile computing device, such as a smartphone, mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In an example embodiment, the computing device may output content to its local display or speaker(s). In another example implementation, the computing device may output content to an external display device (e.g., over Wi-Fi) such as a TV or an external computing system.

Certain embodiments may be connected to at least one client database. Examples of databases, which may be connected to the disclosed system, could include: customer relationship management (CRM) software (e.g., Salesforce), supply chain management (SCM) software or SCM configuration management/version control applications (e.g., Microsoft Team Foundation Server), requirement management software (e.g., IBM Doors, JIRA), SAP, or any other applications that contain sales, marketing, project, SCM, and/or budget data. Data from these databases or servers may be obtained via web services, file imports, enterprise service bus, or any other method.

Some embodiments may provide an option for a user to choose whether to use a pure Agile approach or a hybrid-Agile approach. A hybrid-Agile approach may utilize some aspects of an Agile methodology of management and some aspects of a waterfall or other management methodology. For example, in some embodiments, should a user choose a hybrid-Agile approach, the system may implement stage gates throughout a proposed development schedule. Consistent with a waterfall approach, a subsequent stage of development will begin after the previous stage of development has been successfully completed (i.e., development efforts have successfully completed the previous stage gate). In some embodiments, a default number of stage gates may be implemented by the system. These stages may coincide with the following stages of development: (1) discovery, (2) scope, (3) feasibility, (4) development, (5) verification, (6) implementation. In certain embodiments, a user may be permitted to change the number of stage gates and/or the scheduling of one or all of the default stage gates.

Certain embodiments may provide an option for a user to choose whether the system will manage more than one development track, such as the development of software, firmware, and/or hardware. In some embodiments, any combination of these development efforts may be chosen by a user. For example, some embodiments may manage the development of software; firmware; hardware; software and firmware; software and hardware; firmware and hardware; or software, firmware, and hardware.

Some embodiments may provide visibility into the status of one or all development tracks simultaneously. The system may monitor dependencies of the development process on particular features, resources, and other factors. In some embodiments, the system may identify bottlenecks in the development process and may narrow these bottlenecks to a particular development track, or a particular development team, for instance.

Some embodiments may determine a process agility of the development efforts. For example, the system may receive data including customer requests, individual features, project timeline information, budget information, and other factors; in some embodiments, the system may use this data to evaluate development efforts in one or each domain (i.e., software, firmware, hardware) and may determine whether each domain is on schedule and whether each is able to respond to feature change requests or new technologies quickly. In certain embodiments, the system evaluates development of each feature of each domain on a team-by-team basis. To determine a team's ability to respond to a feature change request or new technology quickly (i.e., the team's process agility), the system can associate financial costs, penalties for failure to meet customer expectations, and the amount of development time required for a given feature change request made by the customer. In some embodiments, this information can be estimated and assigned by a customer or user. In some embodiments, the system assigns predetermined default values. If a development team is able to absorb a feature change request with little to no disruption of its development schedule (i.e., is still able to meet current or original deadlines, while staying within limitations such as available man-power, budget concerns, etc.), the system can indicate that the development team is maintaining a high process agility. It should be realized that process agility not only encompasses feature change requests from the customer but also changes in technology. For example, during development, developers may realize that a certain technology is not in fact suitable for a particular application, which may necessitate an upgrade, change, or pivot in development strategy or the technology used. A development team having high agility is more able to accommodate a feature change request, such as a change requested by a customer, without adversely impacting the development team's ability to meet a particular deadline. Thus, agility may be described as a development team's ability to quickly accommodate changes to an original development schedule without delaying a final product release; high agility will typically lead to lower development costs.

Figure 2A:
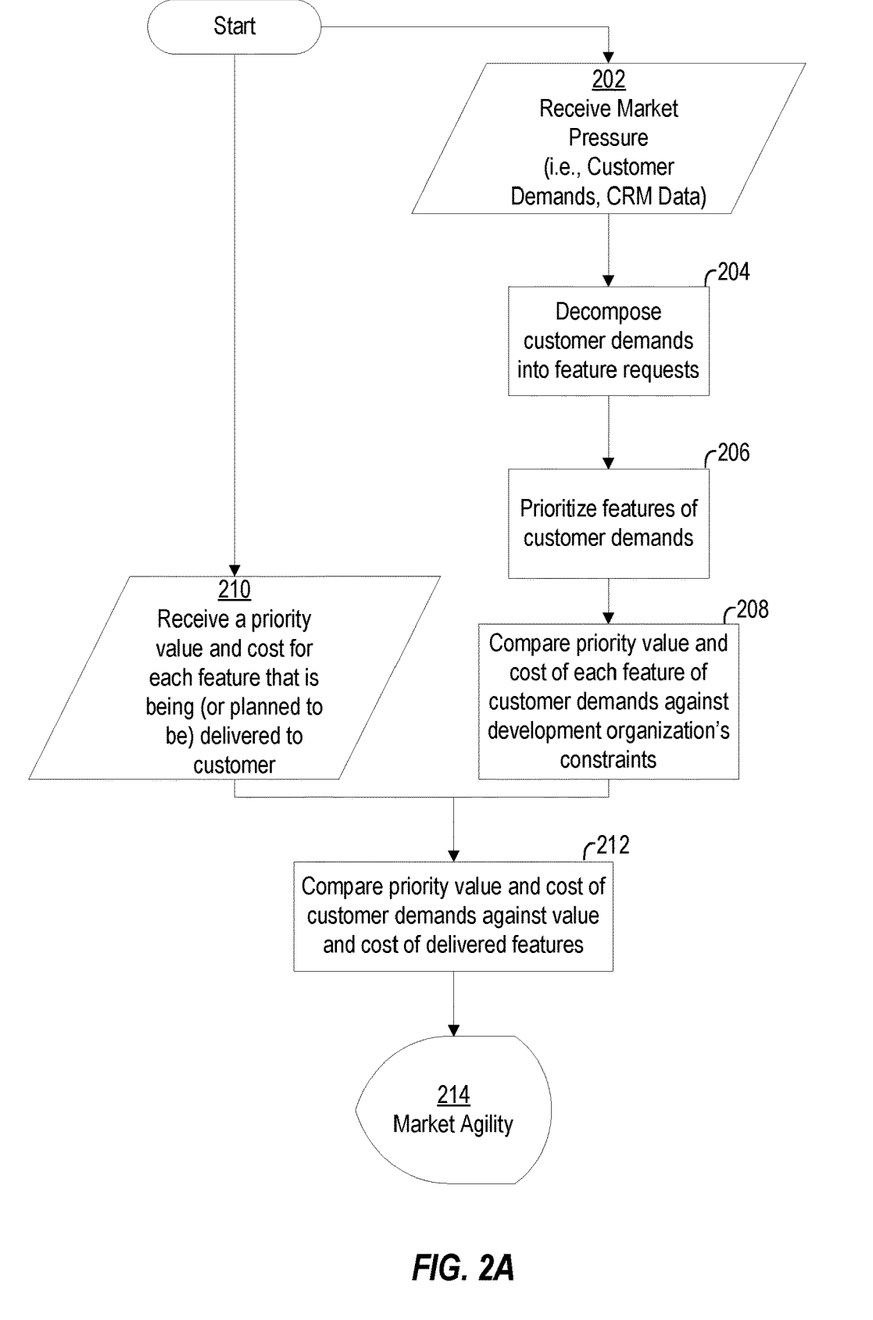
FIG. 2A is a block diagram illustrating a determination of market agility, in accordance with an example embodiment of the present disclosure.
Figure 2B:
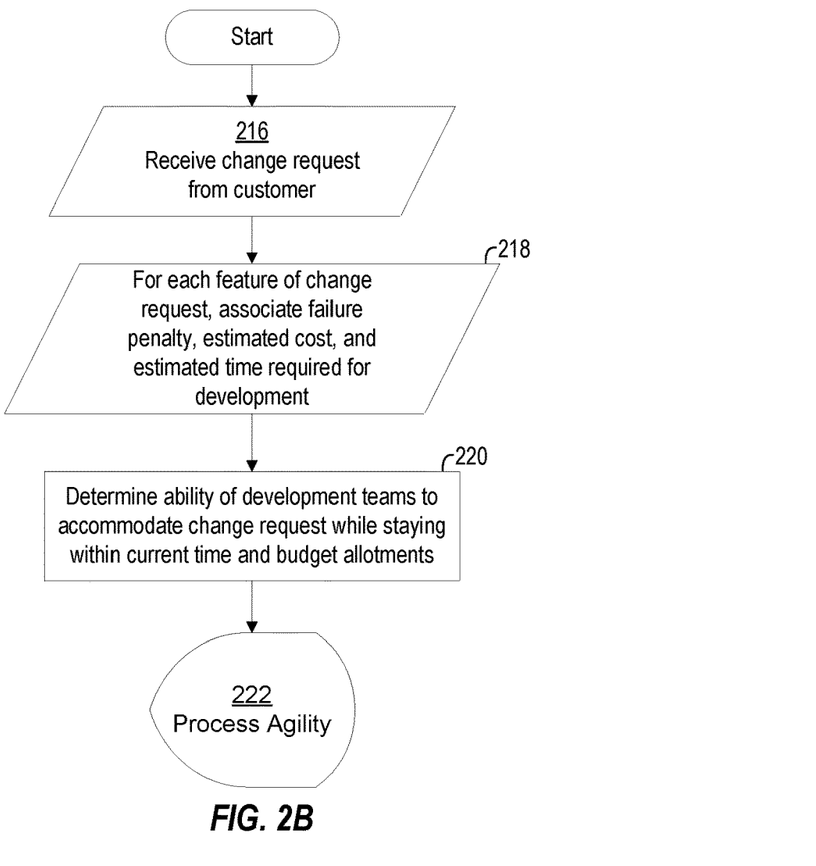
FIG. 2B is a block diagram illustrating a determination of process agility, in accordance with an example embodiment of the present disclosure.

FIG. 2B is a block diagram illustrating a determination of process, according to an example embodiment. The system may receive 216 a change request from a customer, which may be a request to replace or add a feature to the project. The system may also associate 218 a failure penalty, estimated cost, and estimated time required for development for each feature of the change request. The system may then determine 220 the ability of the development team or teams to absorb or accommodate the change request without delaying the current development schedule or missing deadlines and without exceeding the existing development budget. This determination 220 yields the process agility 222 of the development efforts.

Certain embodiments may determine a market agility of the development efforts. For example, the system may compare market pressure information to product requirements data to determine how well development efforts are meeting customer expectations. Market pressures can be indicated in customer contracts, which generally enumerate what the customer wants delivered, and/or customer responses to the delivered products (deliverables may be made to the customer on a rolling basis—at each stage gate in a hybrid-Agile approach, for instance), which can include the number of complaints from the customer, defects reported by the customer, and feature change requests made by the customer or user. Some or all of this data may be taken from a CRM database or server. Value points may be assigned by the user for each feature; these value points may be an estimation of the added value of that particular feature to the overall project and/or the comparative requisite to deliver a product that is satisfactory for the customer. In some embodiments, value points can be assigned by the customer. In some embodiments, the system may assign default value point. The user or customer can adjust the default value points, in certain embodiments.

Because a development organization has a finite amount of resources, the development organization may be unable to provide some features originally desired by the customer. To decide which features to exclude while maintaining the highest customer satisfaction possible, the development organization may consider the market agility of certain product features. The market agility of particular product features may assist in the features that are most desirable to the customer while taking into account the development organizations constraints, which may include budget concerns, time concerns, or other factors. To assist in prioritizing features, the system may associate estimated costs and priority values for each feature desired by the customer. This data may be provided by the customer, user, or set as default values by the system, which may be able to be adjusted by the user or customer. The closer that these values match that of the prioritized, budgeted features that are planned to be delivered to the customer or are actually delivered to the customer, the higher the market agility. Thus, they system may indicate which features are most impactful as deliverables to the customer, and thus which features are most valuable to the development organization in view of its development efforts.

If a development organization must exclude a component, the system may assist in determining the impact of the missing component. If a component is missing, a customer may make a feature change request or may complain or refuse acceptance of a deliverable. This information may be input into a CRM database or server and may be received by the system. There also may be financial or other penalties associated with the missing feature. To determine how well a particular feature meets the customer's expectations, the system may combine the number and criticality of defects reported against the feature, the number and criticality of customer complaints against the feature, and the number, criticality, and cost of corresponding feature change requests made. The cost and criticality may be realized values or estimated values. These values may be received as inputs from either the development organization or the customer. In some embodiments, the market impact for a specific feature (or lack thereof) may be defined as the number of customer-made feature change requests multiplied by the respective priority of each feature change request.

FIG. 2A is a block diagram illustrating a determination of process, according to an example embodiment. The system may receive 202 market pressure data, which can include customer demands and/or CRM data. The system then decomposes 204 the customer demands into separate feature, and after prioritizing 206 those features, the system compares 208 the priority value and cost of each feature of the customer demands to the constraints of the development organization, which may include budget or time concerns. The system may also receive 210 a priority value and cost for each feature that is being delivered, or is planned to be delivered, to the customer. They system may receive 202 the market pressure data and receive 210 the priority value and cost for each feature in any order or in conjunction with one another. The system may then compare 212 the priority value and cost of the customer demands against that of the delivered features, thus yielding the market agility 214 of the development efforts.

In some embodiments, the development system may determine an agile vorticity of the organization's development efforts. Agile vorticity may be defined as a running metric that indicates whether development efforts are on track to meet corresponding goals or deadlines. For example, agile vorticity may indicate whether development efforts are behind schedule, on schedule, or ahead of schedule. Certain embodiments may determine an agile vorticity for the overall development effort. In some embodiments, the system may determine an agile vorticity for each individual development team or for each individual involved in development.

The speed with which development efforts must work to achieve a point of agile vorticity may be determined by evaluating feature requirements data, which may in turn driven by customer data that can come from a customer contract or a feature change request made by the customer. Each feature may be assigned an estimated time requirement for development (e.g., an estimation of IEDs). To determine how fast each development team needs to work, the system may compare the amount of time needed to meet the requirements against the available resources of the user or organization's development efforts.

Figure 2C:
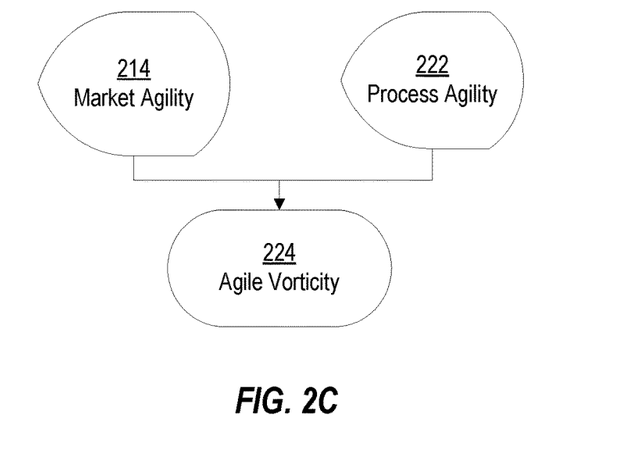
FIG. 2C is a block diagram illustrating a determination of agile vorticity, in accordance with an example embodiment of the present disclosure.

FIG. 2C is a block diagram illustrating a determination of agile vorticity, according to an example embodiment. They system may compare market agility 214 with process agility 222 to yield the agile vorticity 224 of the development efforts.

Certain embodiments may determine and output a business momentum of the development efforts. Business momentum may be described as a running calculation of the scope multiplied by velocity with which development is progressing (i.e., how well the development efforts are adhering to the development schedule or timeline). Thus, business momentum can be a "snapshot" indicating the level of performance of the development team. Each feature requirement may be assigned points or "ideal engineering days" (IEDs), which is a unit of estimated work that is approximately equal to six hours of work for a programmer, tester, etc. In some embodiments, these IEDs are assigned by the user. In some embodiments, IEDs for product features are assigned by the system. IED values assigned by the system may be adjustable by the user, in some embodiments. The IEDs assigned to a particular feature may be compared to the time remaining until a deadline will become due. The velocity with which development is progressing for a particular feature may be determined, for instance, by comparing the total amount of time required for the development of a particular feature against the amount of time that has already been spent on development of that feature.

Figure 3:
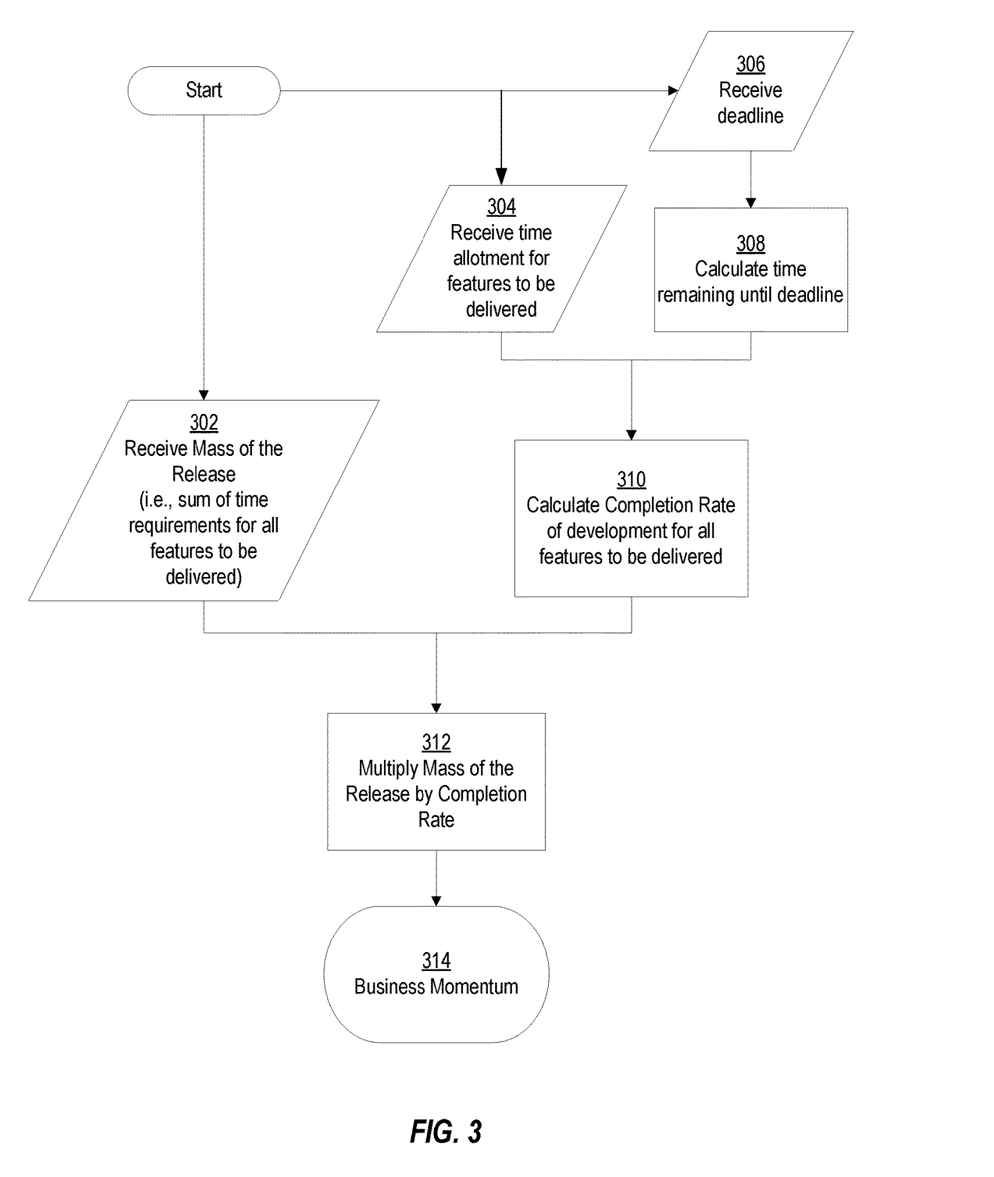
FIG. 3 is a block diagram illustrating a determination of business momentum, in accordance with an example embodiment of the present disclosure.

FIG. 3 is a block diagram illustrating a determination of business momentum, according to an example embodiment. The system may receive 302 a mass of the release, which may refer to the sum of the time requirements for all features to be delivered to the customer. The system may also receive 304 a time allotment for those features that are to be delivered to the customer, as well as receive 306 a deadline to deliver those features. The system may receive 302 the mass of the release, receive 304 the time allotment, and receive 306 the deadline in any given order or in conjunction with one another. Upon receiving 306 the deadline, the system may calculate 308 the amount of time remaining until the deadline. The system may further calculate 310 the completion rate of development for those features to be delivered by comparing the time allotment for the features to be delivered 304 to the time remaining until the deadline 308. The system may then multiply 312 the mass of the release by the completion rate of development for those features to be delivered to the customer to determine business momentum 314.

Certain embodiments may indicate to a user issues associated with development efforts. For example, the agile vorticity metric may identify a problem, such as a decreased process agility, which may also indicate that development efforts will not likely meet expectations set by market agility. In addition to identifying that a problem exists, some embodiments may identify a particular development team or group of teams that are underperforming, which may be the cause of the decreased process agility.

The previous detailed description is merely illustrative in nature and is not intended to limit the present disclosure, or the application and uses of the present disclosure. Furthermore, there is no intention to be bound by any expressed or implied theory presented in the preceding field of use, background or summary of the disclosure or the following detailed description. The present disclosure provides various examples, embodiments and the like, which may be described herein in terms of functional or logical block elements. Various techniques described herein may be used for remote device configuration. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware, or any combination thereof to control a computing device to implement the disclosed subject matter. The term "article of manufacture" as used herein is intended to encompass a computer program accessible from any computing device, carrier, or media. For example, a non-transitory computer-readable medium may include: a magnetic storage device such as a hard disk, a floppy disk, or a magnetic strip; an optical disk such as a compact disk (CD) or digital versatile disk (DVD); a smart card; and a flash memory device such as a card, stick, or key drive. Additionally, it should be appreciated that a carrier wave may be employed to carry computer readable electronic data including those used in transmitting and receiving electronic data such as electronic mail (email) or in accessing a computer network such as the Internet or a local area network (LAN). Of course, a person of ordinary skill will recognize many modifications may be made to this configuration without departing from the scope or spirit of the claimed subject matter.

It is important to recognize that it is impractical to describe every conceivable combination of components or methodologies for purposes of describing the claimed subject matter. However, a person having ordinary skill will recognize that many further combinations and permutations of the subject innovations are possible. Accordingly, the claimed subject matter is intended to cover all such alterations, modifications and variations that are within the spirit and scope of the claimed subject matter.

Although the present disclosure describes specific examples, embodiments, and the like, various modifications and changes may be made without departing from the scope of the present disclosure as set forth in the claims below. For example, although the example methods, devices, or articles of manufacture described herein are in conjunction with managing development efforts, the skilled artisan will readily recognize that the example methods, devices, systems, or articles of manufacture may be used in other methods, devices, systems, or articles of manufacture and may be configured to correspond to such other example methods, devices, systems, or articles of manufacture as needed. Further, while at least one example, embodiment, or the like has been presented in the foregoing detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all of the claims. Any benefits, advantages, or solutions to problems that are described herein with regard to specific examples, embodiments, or the like are not intended to be construed as a critical, required, or essential feature or element of any or all of the claims.

What is claimed is:

1. A method for managing product development comprising:
   receiving development data comprising:
      project requirements data comprising a time value indicating a time required for development for a feature of a project; and
      project timeline data comprising a feature deadline and a development deadline;
   recording an amount of time spent developing the feature; and
   calculating, based at least in part on comparing the time value against the difference between the time required for development for the feature and the amount of time spent developing the feature, business momentum.

2. The method claim 1 further comprising identifying whether a ratio of time value compared to the difference between the time required for development for the feature and the amount of time spent developing the feature fails to meet a predetermined threshold.

3. The method of claim 1, wherein the time value is expressed in units of ideal engineering days, each ideal engineering day equaling approximately six hours of work.

4. The method of claim 1 further comprising, responsive to receiving an indication to apply a hybrid-Agile approach, implementing stage gates, each stage gate being defined as a short-term deadline that occurs prior to the development deadline.

5. The method of claim 1 further comprising:
   receiving an indication of a request to manage development of a combination of software, firmware, and hardware;
   tracking development of the combination; and
   calculating business momentum for the combination.

6. A method for managing product development comprising:
   receiving development data comprising:
      customer data including a first feature of a project;
      project timeline data including a feature deadline and a development deadline;
      budget data; and
      project requirements data comprising:
         requirements of the first feature;
         a first priority value indicating a level of priority of the first feature;
         a first penalty value indicating a penalty for failing to deliver the first feature by at least one of (i) the feature deadline and (ii) the development deadline;
         a first cost value indicating a financial cost of developing the first feature; and
         a first time value indicating a time required for development of the first feature;
   calculating, project agility by calculating the ratio of the time value compared to an amount of time remaining until the feature deadline; and
   calculating market agility by, at least in part, calculating the ratio of the cost value compared to the budget data.

7. The method of claim 6 further comprising calculating an average of the project agility and the market agility.

8. The method of claim 7, wherein the average is referred to as agile vorticity.

9. The method of claim 6 further comprising calculating a sum of the project agility and the market agility.

10. The method of claim 9, wherein the sum is referred to as agile vorticity.

11. The method of claim 6 further comprising calculating a product of the project agility and the market agility.

12. The method of claim 11, wherein the product is referred to as agile vorticity.

13. The method of claim 6 further comprising, upon receiving an indication to apply a hybrid-Agile approach, implementing stage gates, the stage gates being defined as short-term deadlines that all occur prior to the development deadline.

14. The method of claim 6 further comprising:
   receiving an indication of a request to manage development of a combination of software, firmware, and hardware; and
   tracking development of the combination; and
   calculating business momentum for the combination.

15. The method of claim 6 further comprising:
   receiving a feature change request that includes a second feature, wherein the second feature supplements or replaces the first feature;

receiving second project requirement data corresponding to the feature change request, the second project requirement data comprising:
  requirements of the second feature;
  a second priority value indicating a level of priority of the second feature;
  a second penalty value indicating a penalty for failing to deliver the second feature by the feature deadline and/or development deadline;
  a second cost value indicating a financial cost of developing the second feature; and
  a second time value indicating a time required for development of the second feature; and
calculating an updated project agility, which relies at least in part on the second time value and the feature deadline.

16. A method for managing product development comprising:
  receiving development data comprising:
    project timeline data comprising a first feature deadline and a development deadline;
    customer data comprising a first feature of a project;
    budget data; and
    project requirements data comprising:
      a time value indicating a time required for development of the first feature;
      requirements of the first feature;
      a first priority value indicating a level of priority of the first feature;
      a first penalty value indicating a penalty for failing to deliver the first feature by the feature deadline and/or development deadline;
      a first cost value indicating a financial cost of developing the first feature; and
      a first time value indicating a time required for development of the first feature;
  recording an amount of time spent developing the project feature;
  calculating, based at least in part on comparing the time value against the difference between the time required for development for the feature and the amount of time spent developing the feature, business momentum;
  calculating, based at least in part on the time value and the feature deadline, project agility; and
  calculating, based at least in part on the cost value and the budget data, market agility.

17. The method of claim 16 further comprising:
  receiving a feature change request comprising a second feature, wherein the second feature supplements or replaces the first feature;
  receiving second project requirement data corresponding to the feature change request, the second project requirement data comprising:
    requirements of the second feature;
    a second priority value indicating a level of priority of the second feature;
    a second penalty value indicating a penalty for failing to deliver the second feature by the feature deadline and/or development deadline;
    a second cost value indicating a financial cost of developing the second feature; and
    a second time value indicating a time required for development of the second feature; and
  calculating, based at least in part on the second time value and the feature deadline, an updated project agility.

* * * * *